United States Patent
Zhang et al.

(10) Patent No.: US 10,908,608 B2
(45) Date of Patent: Feb. 2, 2021

(54) METHOD AND SYSTEM FOR STITCHING PLANNING TRAJECTORIES FROM CONSECUTIVE PLANNING CYCLES FOR SMOOTH CONTROL EXECUTION OF AUTONOMOUS DRIVING VEHICLES

(71) Applicant: Baidu USA LLC, Sunnyvale, CA (US)

(72) Inventors: Yajia Zhang, Sunnyvale, CA (US); Haoyang Fan, Sunnyvale, CA (US); Liangliang Zhang, Sunnyvale, CA (US); Weicheng Zhu, Sunnyvale, CA (US); Qi Kong, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 240 days.

(21) Appl. No.: 15/874,859

(22) Filed: Jan. 18, 2018

(65) Prior Publication Data
US 2019/0220012 A1 Jul. 18, 2019

(51) Int. Cl.
| | | |
|---|---|---|
| B60W 30/00 | (2006.01) | |
| G01C 21/00 | (2006.01) | |
| G05D 1/02 | (2020.01) | |
| B60W 30/02 | (2012.01) | |
| B62D 6/00 | (2006.01) | |
| G05D 1/00 | (2006.01) | |
| B62D 15/02 | (2006.01) | |
| B60W 30/08 | (2012.01) | |

(52) U.S. Cl.
CPC .......... *G05D 1/0088* (2013.01); *B60W 30/08* (2013.01); *B62D 15/025* (2013.01); *B62D 15/0265* (2013.01); *G05D 1/0212* (2013.01); *G05D 1/0274* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 8,825,265 B1 * | 9/2014 | Ferguson | G05D 1/0287 701/26 |
| 9,120,485 B1 * | 9/2015 | Dolgov | B60W 30/10 |
| 9,645,577 B1 * | 5/2017 | Frazzoli | G05D 1/0088 |
| 2014/0088855 A1 * | 3/2014 | Ferguson | G08G 1/166 701/117 |
| 2018/0194349 A1 * | 7/2018 | McGill, Jr. | B60W 60/0013 |
| 2019/0033085 A1 * | 1/2019 | Ogale | G06N 3/008 |
| 2019/0220012 A1 * | 7/2019 | Zhang | B62D 15/025 |

* cited by examiner

*Primary Examiner* — Adam D Tissot
(74) *Attorney, Agent, or Firm* — Womble Bond Dickinson (US) LLP

(57) ABSTRACT

According to one embodiment, an ADV is controlled according to a first trajectory planned during a first planning cycle. A control error is determined which represents a drifting error at a first location of the ADV at a first point in time at the end of the first planning cycle. A second point in time is selected on the first trajectory. A second trajectory is generated from a second location on the first trajectory corresponding o the second point in time as a starting location of the second trajectory for a second planning cycle as a next planning cycle. A segment of the first trajectory between the first point in time and the second point in time is combined with the second trajectory to generate a third trajectory for the second planning cycle. The ADV is driven and controlled according to the third trajectory corresponding to the second planning cycle.

21 Claims, 9 Drawing Sheets

METHOD AND SYSTEM FOR STITCHING PLANNING TRAJECTORIES FROM CONSECUTIVE PLANNING CYCLES FOR SMOOTH CONTROL EXECUTION OF AUTONOMOUS DRIVING VEHICLES

TECHNICAL FIELD

Embodiments of the present disclosure relate generally to operating autonomous vehicles. More particularly, embodiments of the disclosure relate to planning trajectories for autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. In an L4 level autonomous driving system, a typical trajectory planning module computes trajectories in a high frequency, e.g., 10 Hz, to maintain safety in abrupt dangerous situations. These trajectories will be sent to a control module to execute upon computation completes. Once receiving a new trajectory, the control module discards the trajectory under execution and switches to executing the new one. If switching from one trajectory to another trajectory is not handled properly, the control output will jump and therefore leads to a discomfort driving experience.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
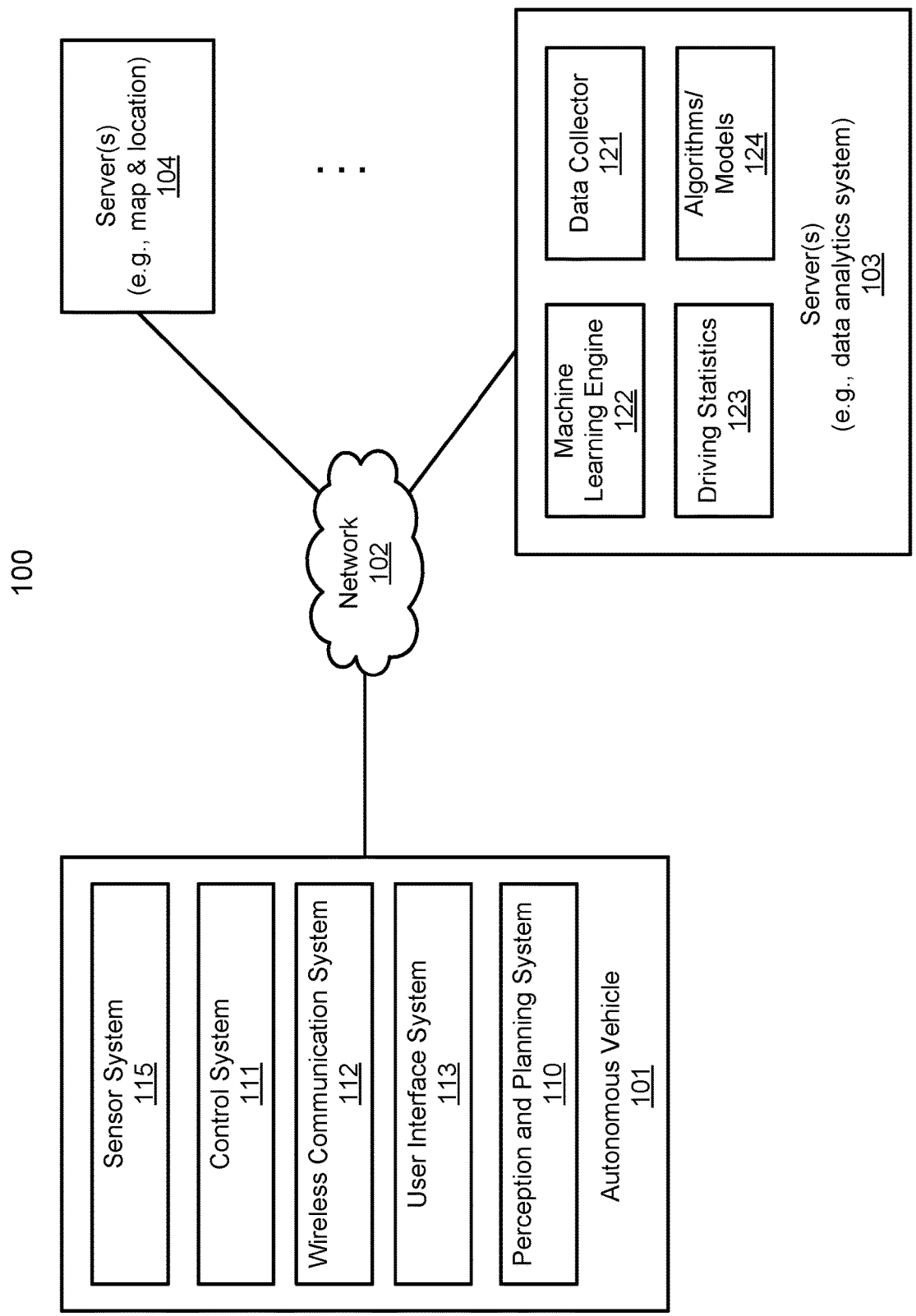
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a planning system is designed to stitch output trajectories from consecutive planning cycles to make the trajectory switching smoothly for controller execution. At the end of a first planning cycle, the system determines a difference between the planned or expected location of an autonomous driving vehicle (ADV) and an actual location of the ADV. The planned or expected location is determined based on a first trajectory planned for the first planning cycle. If the difference representing a control error is less than a predetermined threshold (e.g., 5 meters), the system plans a second trajectory with a starting point farther than the ending point of the first planning cycle (which is the supposed starting point of the next planning cycle). The final trajectory for the next planning cycle is generated based on the second trajectory and a portion of the first trajectory between the expected ending point of the first planning cycle and the starting point of the second trajectory.

According to one embodiment, an ADV is controlled according to a first trajectory planned during a first planning cycle. A control error is determined which represents a drifting error at a first location of the ADV at a first point in time at the end of the first planning cycle. A second point in time is selected on the first trajectory, where the second point in time is forward in time from the first point in time. A second trajectory is generated from a second location on the first trajectory corresponding to the second point in time as a starting location of the second trajectory for a second planning cycle as a next planning cycle. A segment of the first trajectory between the first point in time and the second point in time is combined with the second trajectory to generate a third trajectory for the second planning cycle. The ADV is driven and controlled according to the third trajectory corresponding to the second planning cycle.

According to one embodiment, the control error is examined to determine whether the control error is less than a predetermined threshold. The second point in time is selected away from the first point in time for generating the second trajectory if the control error is less than the predetermined threshold. Otherwise, a fourth trajectory is planned and generated based on the actual location and states of the ADV at the end of the first planning cycle. The actual location of the ADV at the end of the first planning cycle is utilized as a starting point of the fourth trajectory for the next planning cycle and the fourth trajectory is utilized to control the ADV for the next planning cycle.

In one embodiment, in determining the control error, the actual location of the ADV corresponding to the first point in time is determined. An expected location of the ADV on the first trajectory corresponding to the first point in time is then determined. A difference between the actual location and the expected location of the ADV at the first point in time is calculated as the control error. The duration in time between the first point in time and the second point in time is greater than or equals to the duration in time of a planning cycle. The portion of the first trajectory between the first and second points in time is concatenated onto the starting point of the second trajectory to generate the third trajectory.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
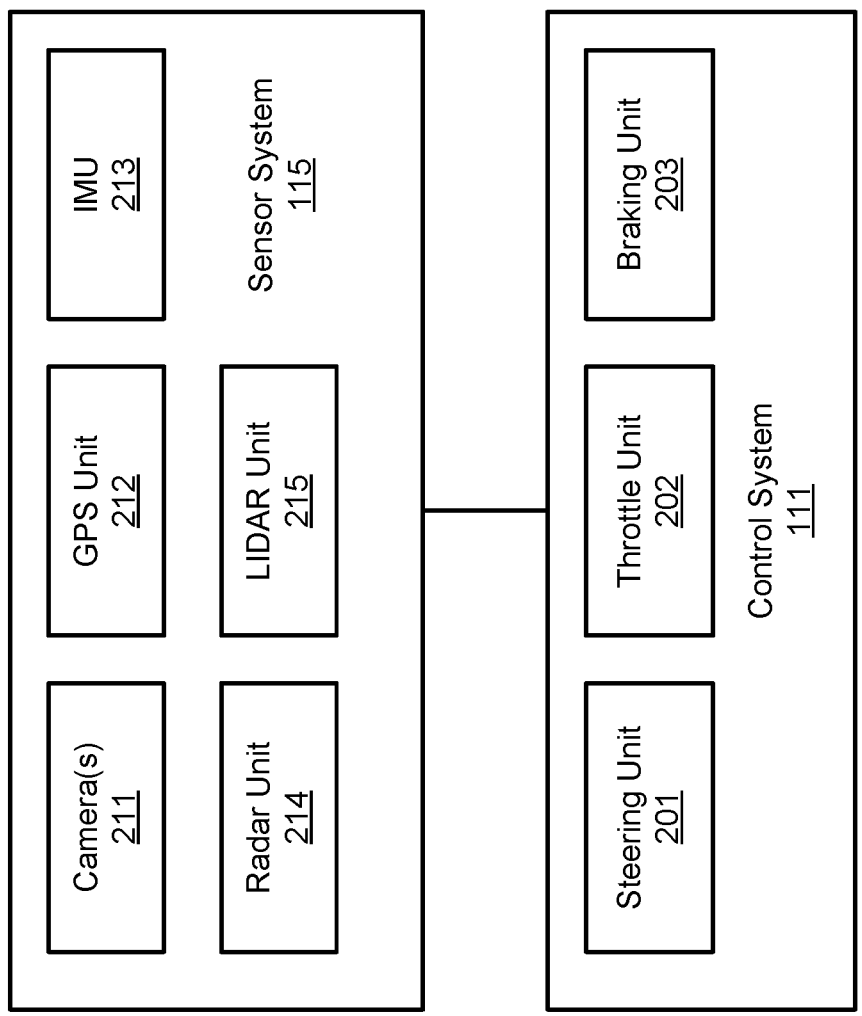
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 may include information concerning a control error threshold of a control error that is utilized to determine whether the trajectories generated by two consecutive planning cycles should be stitched or combined to generate a smoother trajectory. The error threshold may be determined by examining the driving statistics 123 of a variety of vehicles. In addition, an amount of time to skip ahead in planning a new trajectory (referred to as delta time, Δt) may also be determined based on the driving statistics 123, such that the vehicles can operate smoothly between two trajectories planned in two consecutive planning cycles. The amount of time (e.g., delta time) may be related to the system delay of a particular type of vehicles. Therefore, the threshold and the delta time may vary dependent upon the types of the vehicles. The goal is to plan a trajectory for the next planning cycle with a starting point in time, such that when the control module receives the planned trajectory for the next planning cycle, the vehicle is near the starting point of the trajectory. As a result, the transition from one trajectory to another trajectory is smooth.

Figure 3A:
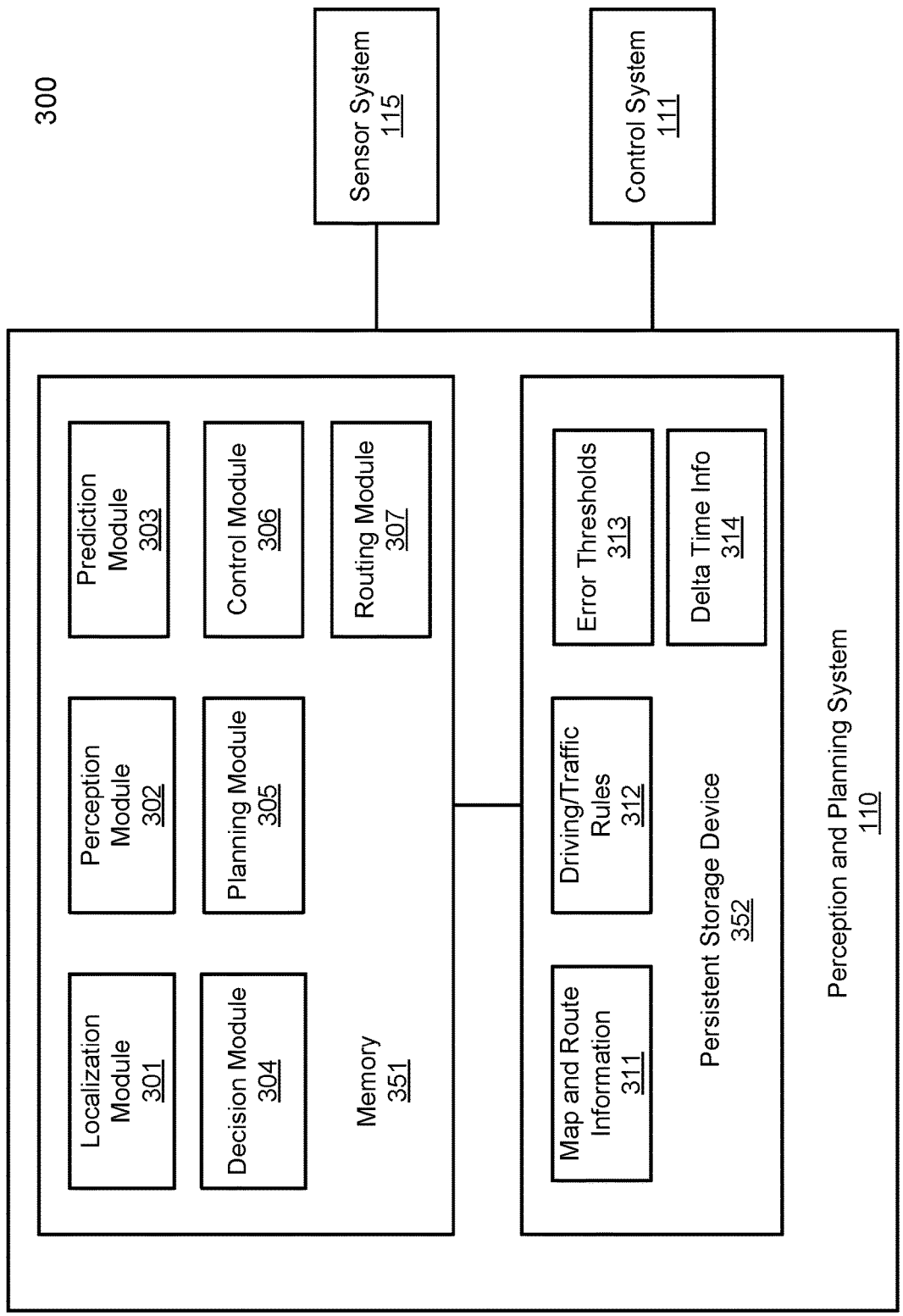
FIGS. 3A-3B are block diagrams illustrating an example of a perception and planning system used with an autonomous vehicle according to one embodiment.
Figure 3B:
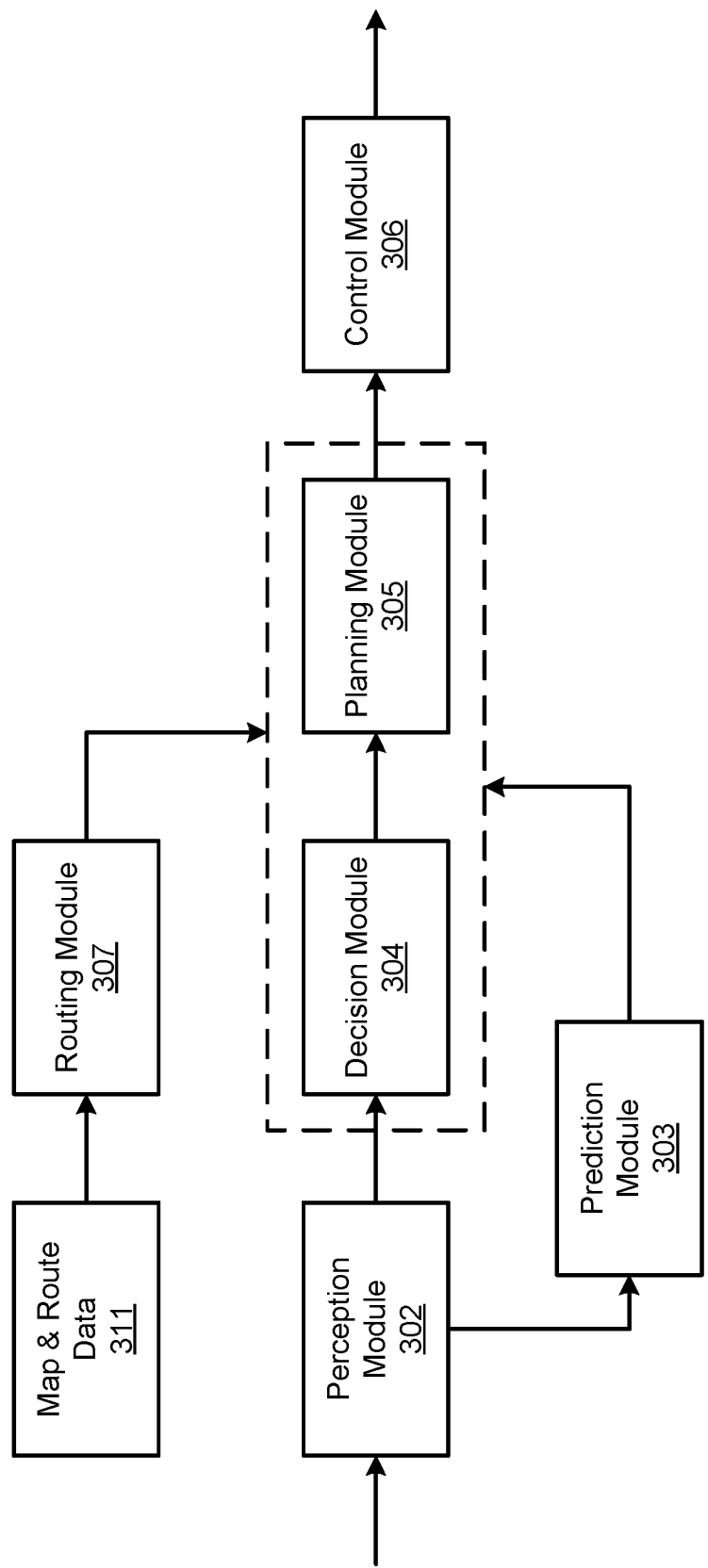

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, planning module 305 is configured to stitch output trajectories from consecutive planning cycles to make the trajectory switching smoothly for controller execution. At the end of a first planning cycle, planning module 305 determines a difference between the planned or expected location of the ADV and an actual location of the ADV. The planned or expected location is determined based on a first trajectory planned for the first planning cycle. If the difference representing a control error is less than a predetermined threshold (e.g., 5 meters), the system plans a second trajectory with a starting point farther than the ending point of the first planning cycle (which is the supposed starting point of the next planning cycle). The predetermined threshold may be predetermined based on driving history or configured by a user, which may be stored as a part of error threshold 313. The final trajectory for the next planning cycle is generated based on the second trajectory and a portion of the first trajectory between the expected ending point of the first planning cycle and the starting point of the second trajectory. If the control error is greater than the predetermined threshold, planning module 305 plans a trajectory for a next planning cycle as usual based on the current states of the vehicle. The states of a vehicle may include a position, heading direction, velocity, and/or acceleration, etc. of the vehicle.

Figure 4:
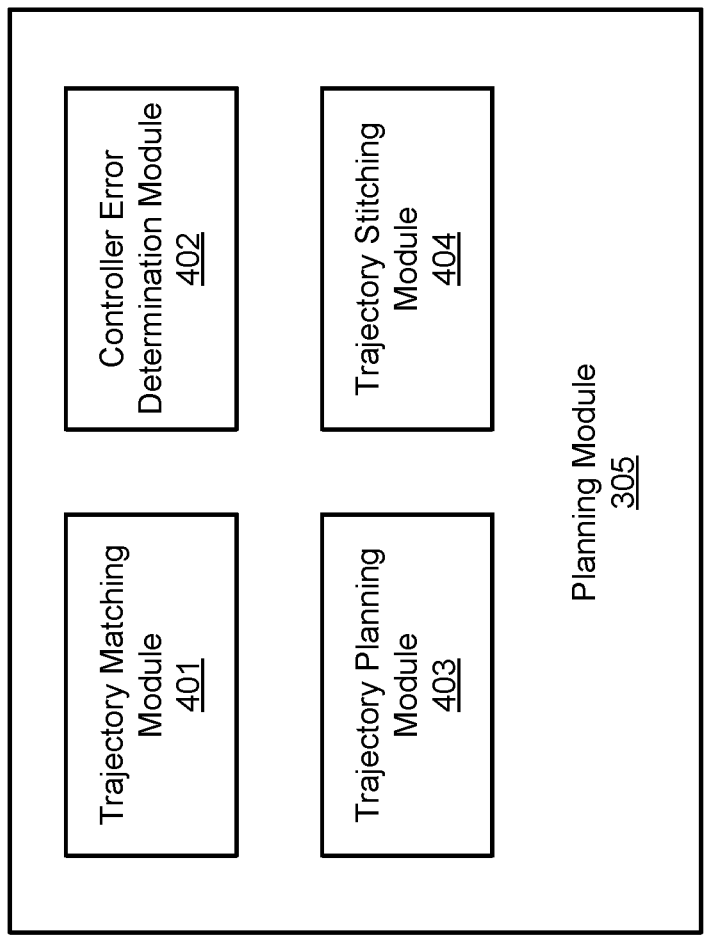
FIG. 4 is a block diagram illustrating an example of a planning module according to one embodiment.

FIG. 4 is a block diagram illustrating an example of a planning module according to one embodiment of the invention. Referring to FIG. 4, planning module 305 includes a trajectory matching module 401, a control error determination module 402, a trajectory planning module 403, and a trajectory stitching or combine module 404. According to one embodiment, an ADV is controlled according to a first trajectory planned during a first planning cycle. At a first point in time, trajectory matching module 401 matches the actual location of the vehicle with a first trajectory point of the vehicle on the first trajectory corresponding to the first point in time.

A control error is determined by control error determination module 401, where the control error represents a drifting error at a first location of the ADV at a first point in time at the end of the first planning cycle. A second point in time is selected by trajectory matching module 402 on the first trajectory, where the second point in time is forward in time from the first point in time. The difference between the first point in time and the second point in time may be predetermined via training based on the history of the driving records or alternatively, it can be preconfigured by a user, which may be stored as a part of delta time or time increments 314. The control error is determined based on the difference between the actual location of the vehicle at the first point in time and the first trajectory point on the first trajectory corresponding to the first point in time.

A second trajectory is generated by trajectory planning module 403 from a second location on the first trajectory corresponding to the second point in time as a starting location of the second trajectory for a second planning cycle as a next planning cycle. A segment of the first trajectory between the first point in time and the second point in time is combined with the second trajectory by trajectory combine module 404 to generate a third trajectory as the final trajectory for the second planning cycle. The ADV is driven and controlled according to the third trajectory corresponding to the second planning cycle.

According to one embodiment, the control error is examined by control error determination module 401 to determine whether the control error is less than a predetermined threshold. The second point in time is selected forwardly in time from the first point in time for generating the second trajectory if the control error is less than the predetermined threshold. Otherwise, a fourth trajectory is planned and generated based on the actual location and states of the ADV at the end of the first planning cycle. The actual location and states may be provided by the localization module and the IMU unit. The actual location of the ADV at the end of the first planning cycle is utilized as a starting point of the fourth trajectory for the next planning cycle and the fourth trajectory is utilized to control the ADV for the next planning cycle.

In one embodiment, in determining the control error, the actual location of the ADV corresponding to the first point in time is determined by trajectory matching module 402. An expected location of the ADV on the first trajectory corresponding to the first point in time is then determined. A difference between the actual location and the expected location of the ADV at the first point in time is calculated as the control error. The duration in time between the first point in time and the second point in time is greater than or equals to the duration in time of a planning cycle. The portion of the first trajectory between the first and second points in time is concatenated onto the starting point of the second trajectory to generate the third trajectory.

Figure 5:
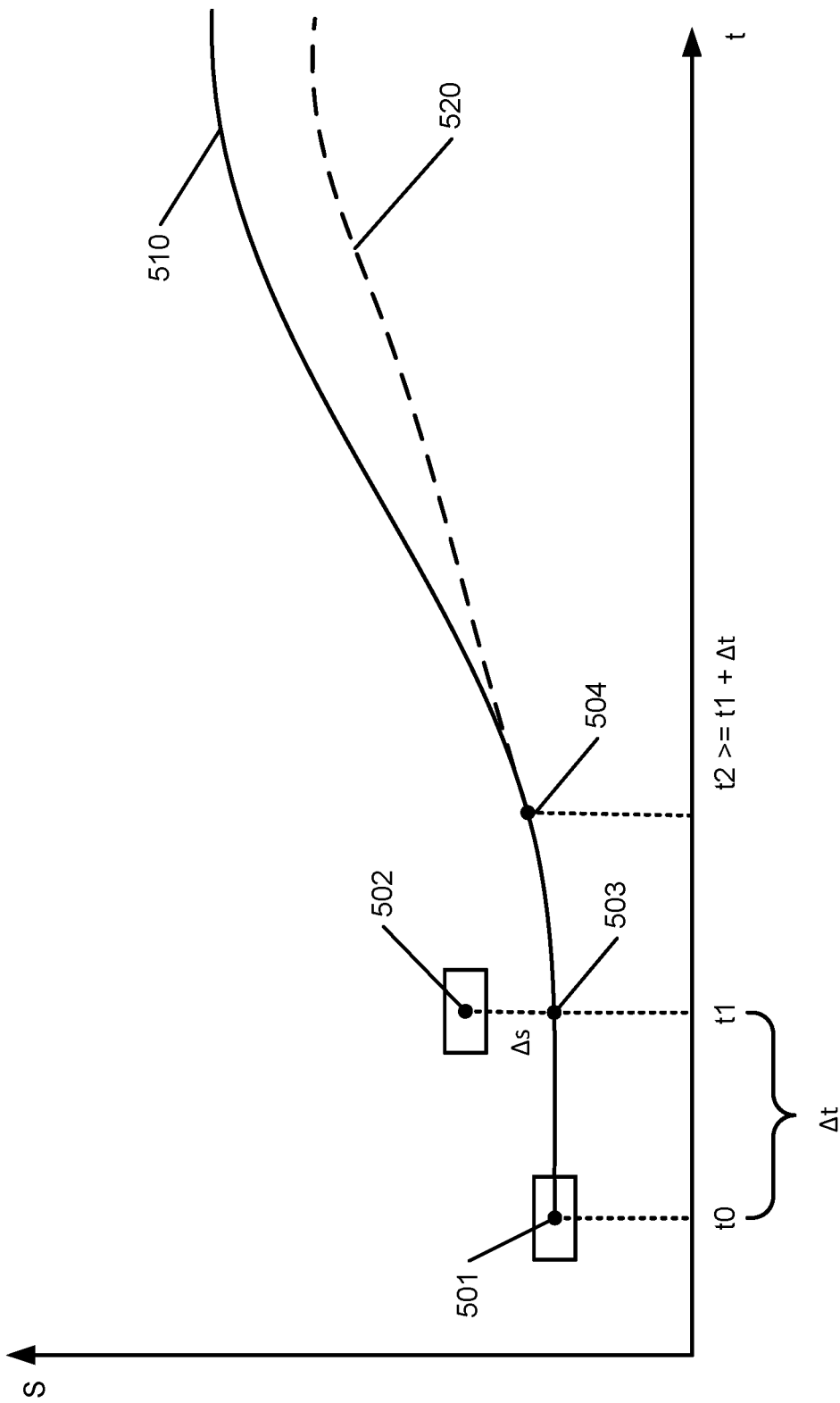
FIG. 5 is a diagram illustrating trajectory planning processing according to one embodiment.

FIG. 5 is a diagram illustrating a process of trajectory planning according to one embodiment. Referring to FIG. 5, at time t0 of a first planning cycle and at location 501, planning module 305 generates a first trajectory 510 (represented by the solid line starting at time t0) and provides the first trajectory 510 to control module 306 to drive and control the ADV according to first trajectory 510. Near the end of the first planning cycle, it is assumed the ADV is at time t1 and its actual location is at location 502, which is off the first trajectory 510 due to control error represented by Δs. In one embodiment, at time t1, trajectory matching module 401 matches and finds trajectory point 503 on first trajectory 510 as a matching point that matches in time with actual location 502.

In one embodiment, control error determination module 401 examines the control error Δs to determine whether the control error is less than a predetermined threshold, such as, for example, 5 meters (m). If the control error is less than the predetermined threshold, trajectory planning module 403 is configured to determine and select a second trajectory point 504 as a planning point, in this example, at point in time t2. Planning point 504 is forwardly in time from matching point 503. In one embodiment, the difference in time between the matching point 503 and the planning point 504 is greater than or equaled to the time duration of a planning cycle, referred to as Δt. That is |t2−t1|>=Δt. In one embodiment, Δt is approximately ranging from 0.1 to 0.2 seconds.

Based on the planning point 504, trajectory planning module 403 is configured to planning a second trajectory 520 using a trajectory point or location corresponding to the planning point 504 on the first trajectory 510. Second trajectory 520 is represented by a dotted or dash line starting from trajectory point 504. Once second trajectory 520 has been generated, trajectory combine module 404 is configured to combine a segment of first trajectory 510 and second trajectory 520 to generate a third trajectory as the final trajectory for the next planning cycle. In one embodiment, trajectory combine module 404 is configured to determine the segment of first trajectory 510 between a trajectory point corresponding to matching point 503 and planning point 504. Trajectory combine module 404 combines the segment of first trajectory 510 and second trajectory 520 to form the third trajectory. The third trajectory is then provided to control module 306 for execution of the trajectory. On the other hand, if the control error is greater than the predetermined threshold, the trajectory planning module 503 then performs the conventional trajectory planning based on the current states and status of the vehicle. The states of a vehicle include, but are not limited to, the coordinates of the vehicle in the map frames, vehicle linear and angular velocity, linear and angular acceleration, etc.

By advancing the planning point of a trajectory for the next planning cycle, the vehicle can operate much smoother than a conventional trajectory planning approach. One of the reasons for this approach is that the matched point is obtained by matching vehicle states using the current time. When a trajectory is being planned, it will take some time to compute and the controller is still running using the trajectory received from the last planning cycle. Therefore, the current planning cycle actually plans the trajectory for future use by the controller. The planning point is the approximated point when the controller switches driving onto the new trajectory.

For example, it is assumed that we start planning from the matched point 503 instead of the planning point 504 (planning without jumping ahead Δt), after planning, we sent the new trajectory traj1 to controller. Before the controller receives the new trajectory traj1, it would continuing executing the old trajectory traj0. Suppose the trajectory point p0 (e.g., trajectory point 503) is the point the controller execution has reached. Once the controller receives traj1, it will compute a control starting point p1 from traj1 (e.g., near trajectory point 504) according to either time or vehicle position, depends on controllers' detailed implementation, because the controller needs to know where the control system is with respect to the new trajectory. It will be very likely that p0 and p1 are different and when the controller computes the control output, the output will jump due to the difference between p0 and p1. By advancing the planning point of the new trajectory ahead near the control starting point p1, the jump magnitude can be greatly reduced, which leads to a smoother transition.

Figure 6:
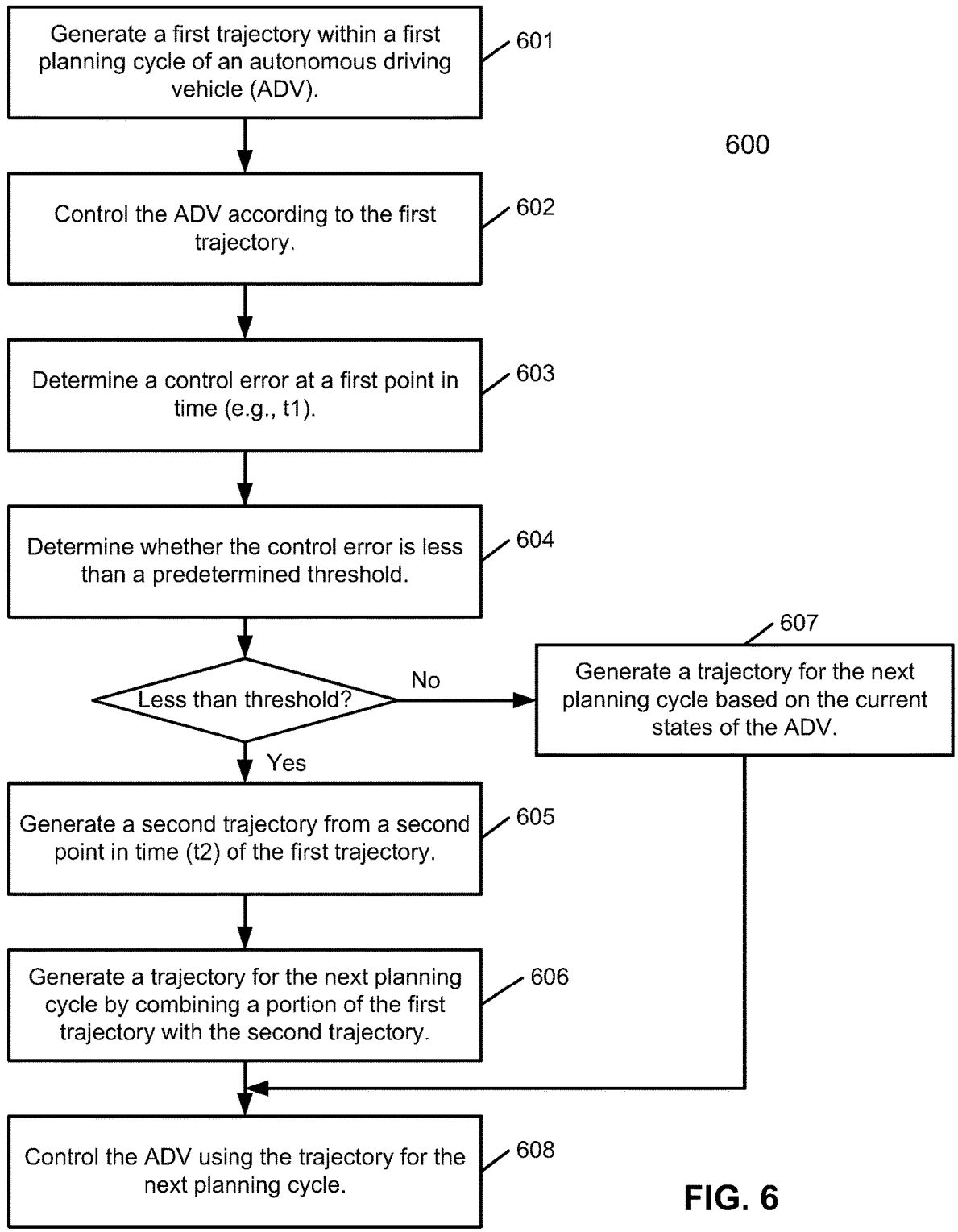
FIG. 6 is a flow diagram illustrating an example of a process for planning a trajectory according to one embodiment.

FIG. 6 is a flow diagram illustrating a process of planning a trajectory according to one embodiment. Process 600 may be performed by processing logic which may include software, hardware, or a combination thereof. For example, process 600 may be performed by planning module 305 and/or control module 306. Referring to FIG. 6, in operation 601, processing logic generates a first trajectory for a first planning cycle for controlling an ADV. In operation 602, processing logic controls and drives the ADV according to the first trajectory. In operation 603, a control error is determined at a first point time after the execution of the first trajectory of the first planning cycle. In operation 604, processing logic determines whether control error is less than a predetermined threshold. If the control error is less than the predetermined threshold, in operation 605, processing logic generates a second trajectory from a second point in time of the first trajectory. The second point in time is forwardly in time from the first point in time. The difference between the first point in time and the second point in time is greater than or equals to the time duration of a planning cycle. In operation 606, processing logic generates a third trajectory by combining a portion of the first trajectory between the first and second points in time and the second trajectory. If the control error is greater than the predetermined threshold, in operation 607, processing logic generates the trajectory for the next planning cycle based on the current states of the vehicle, instead of from the first trajectory.

Figure 7:
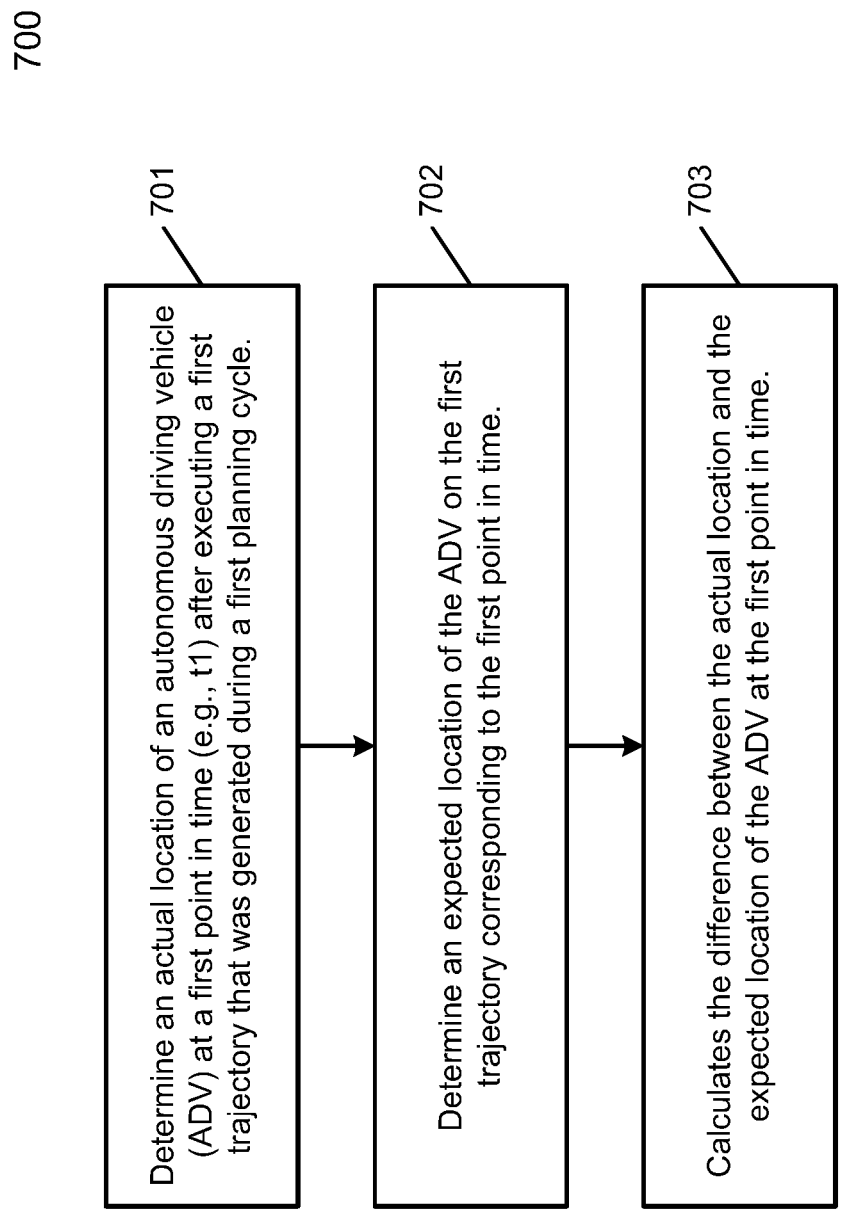
FIG. 7 is a flow diagram illustrating an example of a process for planning a trajectory according to another embodiment.

FIG. 7 is a flow diagram illustrating an example of a process for planning a trajectory according to one embodiment. Process 700 may be performed as a part of operation 604 of FIG. 6. Referring to FIG. 7, in operation 701, processing logic determines an actual location of an ADV at a first point in time after executing a first trajectory that was generated during a first planning cycle. In operation 702, processing logic determines an expected location of the ADV on the first trajectory corresponding to the first point in time. In operation 703, processing logic calculates the difference between the actual location of the ADV and the expected location of the ADV, where the difference is utilized as a part of a control error.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
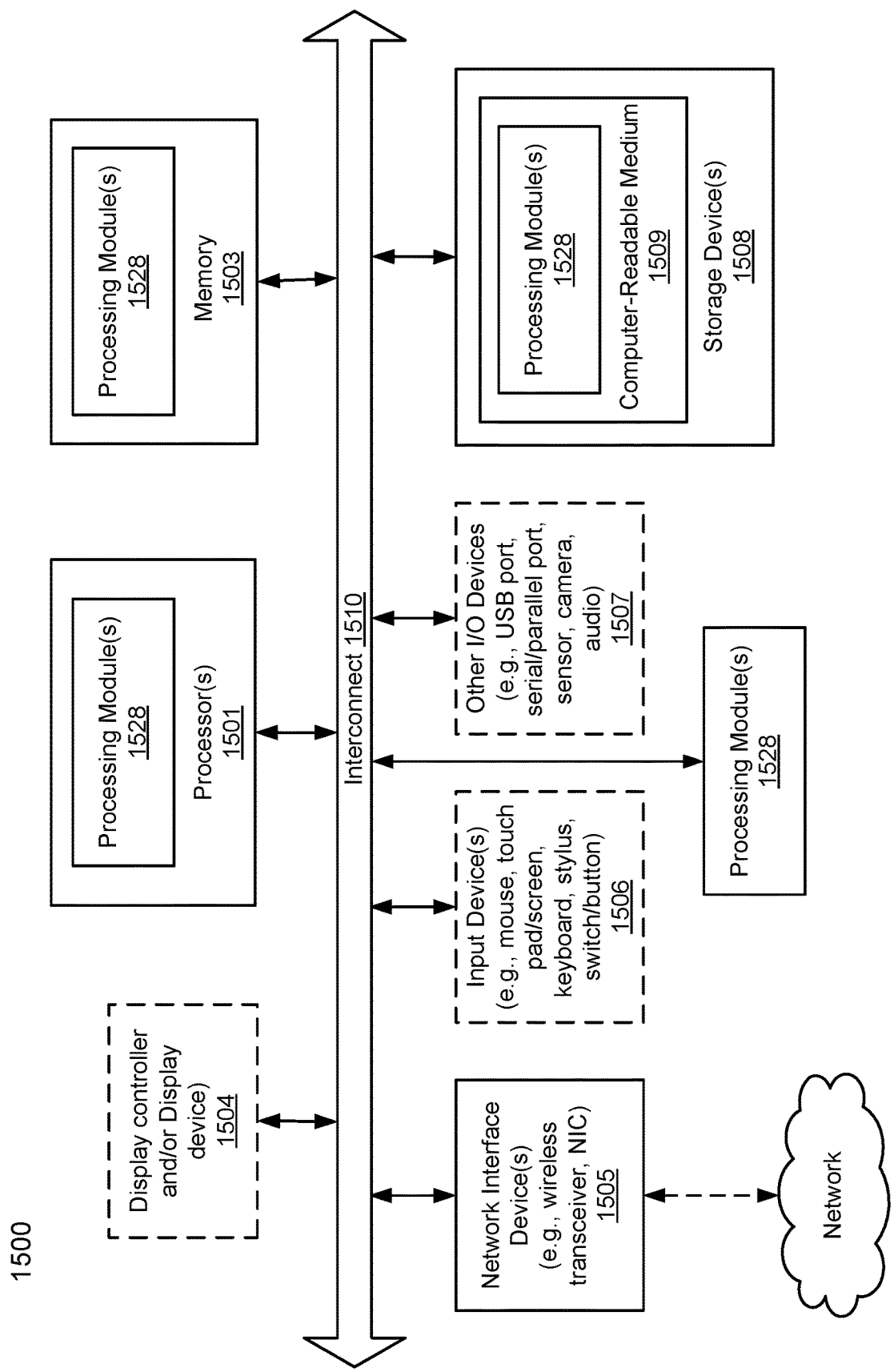
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

TO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305 and/or control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   controlling an autonomous driving vehicle (ADV) according to a first trajectory at a first planning cycle of the ADV;
   determining a control error representing a drifting error at a first location of the ADV at a first point in time at an end of the first planning cycle;
   selecting a second point in time on the first trajectory, the second point being forward in time from the first point in time;
   generating a second trajectory from a second location on the first trajectory corresponding to the second point in time as a starting location of the second trajectory for a second planning cycle as a next planning cycle;
   generating a third trajectory for the second planning cycle by concatenating a segment of the first trajectory between the first point in time and the second point in time onto the starting location of the second trajectory; and
   controlling, by a processor, the ADV to drive autonomously according to the third trajectory corresponding to the second planning cycle such that the ADV operates smoothly from the first planning cycle to the second planning cycle to allow a comfortable experience.

2. The method of claim 1, further comprising determining whether the control error is less than a predetermined threshold, wherein the second point in time is selected for generating the second trajectory in response to determining that the control error is less than the predetermined threshold.

3. The method of claim 2, further comprising, in response to determining that the control error is not less than the predetermined threshold, generating a fourth trajectory based on an actual location of the ADV at the first point in time as a starting location of the next planning cycle.

4. The method of claim 1, wherein determining a control error representing a drifting error at a first location of the ADV at a first point in time comprises:
   determining an actual location of the ADV at the first point in time;
   determining an expected location of the ADV on the first trajectory corresponding to the first point in time; and
   calculating a difference between the actual location and the expected location of the ADV.

5. The method of claim 1, wherein a difference in time between the first point in time and the second point in time is greater than a duration of a planning cycle.

6. The method of claim 5, wherein the duration of a planning cycle is approximately ranging from 0.1 to 0.2 seconds.

7. The method of claim 1, wherein combining a segment of the first trajectory between the first point in time and the second point in time with the second trajectory comprises concatenating the segment of the first trajectory at a beginning of the second trajectory at the second point in time.

8. A non-transitory machine-readable medium having instructions stored therein, which when executed by a processor, cause the processor to perform operations, the operations comprising:
controlling an autonomous driving vehicle (ADV) according to a first trajectory at a first planning cycle of the ADV;
determining a control error representing a drifting error at a first location of the ADV at a first point in time at an end of the first planning cycle;
selecting a second point in time on the first trajectory, the second point being forward in time from the first point in time;
generating a second trajectory from a second location on the first trajectory corresponding to the second point in time as a starting location of the second trajectory for a second planning cycle as a next planning cycle;
generating a third trajectory for the second planning cycle by concatenating a segment of the first trajectory between the first point in time and the second point in time onto the starting location of the second trajectory; and
controlling, by a processor, the ADV to drive autonomously according to the third trajectory corresponding to the second planning cycle such that the ADV operates smoothly from the first planning cycle to the second planning cycle to allow a comfortable experience.

9. The machine-readable medium of claim 8, wherein the operations further comprise determining whether the control error is less than a predetermined threshold, wherein the second point in time is selected for generating the second trajectory in response to determining that the control error is less than the predetermined threshold.

10. The machine-readable medium of claim 9, wherein the operations further comprise, in response to determining that the control error is not less than the predetermined threshold, generating a fourth trajectory based on an actual location of the ADV at the first point in time as a starting location of the next planning cycle.

11. The machine-readable medium of claim 8, wherein determining a control error representing a drifting error at a first location of the ADV at a first point in time comprises:
determining an actual location of the ADV at the first point in time;
determining an expected location of the ADV on the first trajectory corresponding to the first point in time; and
calculating a difference between the actual location and the expected location of the ADV.

12. The machine-readable medium of claim 8, wherein a difference in time between the first point in time and the second point in time is greater than a duration of a planning cycle.

13. The machine-readable medium of claim 12, wherein the duration of a planning cycle is approximately ranging from 0.1 to 0.2 seconds.

14. The machine-readable medium of claim 8, wherein combining a segment of the first trajectory between the first point in time and the second point in time with the second trajectory comprises concatenating the segment of the first trajectory at a beginning of the second trajectory at the second point in time.

15. A data processing system, comprising:
a processor; and
a memory coupled to the processor to store instructions, which when executed by the processor, cause the processor to perform operations, the operations including
controlling an autonomous driving vehicle (ADV) according to a first trajectory at a first planning cycle of the ADV,
determining a control error representing a drifting error at a first location of the ADV at a first point in time at an end of the first planning cycle,
selecting a second point in time on the first trajectory, the second point being forward in time from the first point in time,
generating a second trajectory from a second location on the first trajectory corresponding to the second point in time as a starting location of the second trajectory for a second planning cycle as a next planning cycle,
generating a third trajectory for the second planning cycle by concatenating a segment of the first trajectory between the first point in time and the second point in time onto the starting location of the second trajectory, and
controlling, by a processor, the ADV to drive autonomously according to the third trajectory corresponding to the second planning cycle such that the ADV operates smoothly from the first planning cycle to the second planning cycle to allow a comfortable experience.

16. The system of claim 15, wherein the operations further comprise determining whether the control error is less than a predetermined threshold, wherein the second point in time is selected for generating the second trajectory in response to determining that the control error is less than the predetermined threshold.

17. The system of claim 16, wherein the operations further comprise, in response to determining that the control error is not less than the predetermined threshold, generating a fourth trajectory based on an actual location of the ADV at the first point in time as a starting location of the next planning cycle.

18. The system of claim 15, wherein determining a control error representing a drifting error at a first location of the ADV at a first point in time comprises:
determining an actual location of the ADV at the first point in time;
determining an expected location of the ADV on the first trajectory corresponding to the first point in time; and
calculating a difference between the actual location and the expected location of the ADV.

19. The system of claim 15, wherein a difference in time between the first point in time and the second point in time is greater than a duration of a planning cycle.

20. The system of claim 19, wherein the duration of a planning cycle is approximately ranging from 0.1 to 0.2 seconds.

21. The system of claim 15, wherein combining a segment of the first trajectory between the first point in time and the second point in time with the second trajectory comprises concatenating the segment of the first trajectory at a beginning of the second trajectory at the second point in time.

* * * * *